United States Patent [19]

Kuramoto et al.

[11] 4,067,030

[45] Jan. 3, 1978

[54] CAMERA FOCUSSING AID

[75] Inventors: Yoshio Kuramoto, Toyonaka; Toshinori Imura; Yoshiiku Kikukawa, both of Sakai, all of Japan

[73] Assignee: Minolta Camera Kabushiki Kaisha, Osaka, Japan

[21] Appl. No.: 650,821

[22] Filed: Jan. 20, 1976

[30] Foreign Application Priority Data

Jan. 24, 1975 Japan ............................... 50-10869
Mar. 24, 1975 Japan ............................... 50-34542
Mar. 29, 1975 Japan ............................... 50-37402

[51] Int. Cl.² ..................... G03B 15/03; G03B 3/00
[52] U.S. Cl. ............................... 354/139; 354/149; 354/165; 354/200
[58] Field of Search ............... 354/25, 164, 165, 166, 354/198, 199, 200, 201, 219, 139, 149

[56] References Cited

U.S. PATENT DOCUMENTS

| 2,153,132 | 4/1939 | Crowther | 354/198 X |
|---|---|---|---|
| 2,312,261 | 2/1943 | Mills | 354/165 |
| 3,393,623 | 7/1968 | Gutmann et al. | 354/219 X |
| 3,435,744 | 4/1969 | Stimson | 354/165 X |
| 3,643,574 | 2/1972 | Moriyama et al. | 354/165 |
| 4,001,850 | 1/1977 | Fujita | 354/219 |

*Primary Examiner*—L. T. Hix
*Assistant Examiner*—M. L. Gellner
*Attorney, Agent, or Firm*—Wolder & Gross

[57] ABSTRACT

A camera focussing aid includes an auxiliary light projector directing a light beam forwardly of the camera and mounted in the camera body or in a separable flash unit. A mechanism is provided for deactivating the auxiliary projector during the camera exposure sequence and includes a switch network connecting the auxiliary projector lamp to a battery, the switch being opened either with the depression of the shutter release member, the initiation of the shutter opening, the closing of the flash triggering switch or a drop in voltage across the flash charge capacitor. The projector beam is advantageously of small divergence and the auxiliary projector may be used with a camera having a split image range finder or a single lens reflex camera.

30 Claims, 14 Drawing Figures

CAMERA FOCUSSING AID

BACKGROUND OF THE INVENTION

The present invention relates generally to improvements in photographic apparatus and it relates more particularly to an improved photography aid which facilitates the focussing of a camera under conditions of darkness or low ambient light.

Generally in the practice of flash photography or long exposure photography, it is very common that a photographic object is so dark that a photographer can not accurately determine through a viewfinder whether the photographic object is in focus or not. To solve this problem, a device has been proposed in the Japanese Laid-Open Utility Model Publication No. Sho 49-141128(1974), in which there is provided a device that projects light along a cylindrical path, and allows adjustment of the light intensity, and that is adapted to be mounted on a flash device, so that a lamp of the aforesaid light projecting device may be lit by closing a potential source switch in the flash device.

However, such prior art device possesses, among other drawbacks, an important shortcoming in that because the auxiliary lamp is kept lit during photographing, a reproduction of the spotlight from the auxiliary lamp results in the photographed picture.

SUMMARY OF THE INVENTION

It is a principal object of the present invention to provide an improved camera apparatus.

Another object is to provide an improved device for facilitating the focussing of a camera under dark or low ambient light conditions without interfering with or adversely effecting the photographic results.

Still another object of the present invention is to provide an improved object auxiliary illuminating means for facilitating the accurate focussing of the camera on the object with the obviation of any adverse effects of such illumination on the photographic procedure or results.

A further object of the present invention is to provide an apparatus of the above nature characterized in its reliability, ruggedness, ease and accuracy of application and high versatility and adaptability.

The above and other objects of the present invention will become apparent from a reading of the following description taken in conjunction with the accompanying drawings which illustrate preferred embodiments thereof.

In a sense the present invention contemplates the provision in a camera apparatus including a forwardly directed objective lens, a shutter and an exposure mechanism for sequentially opening and closing the shutter, the improvement comprising an auxiliary light projector forwardly directing a beam of light and means responsive to the operation of the exposure mechanism for deactivating the auxiliary light projector during the open condition of the shutter. The auxiliary light projector may be mounted directly in the camera body or in an electronic flash unit separably mounted on the camera body and may be employed with a single lens reflex type of camera or a camera provided with a split image focussing mechanism and the auxiliary projector may be automatically angularly adjusted by the camera focussing mechanism in accordance with the object distance to compensate for parallax. The auxiliary projector advantageously forms a very narrow light beam or one of low divergence which may have any desired transverse cross section. In its preferred form the lamp of the auxiliary projector is connected through a switch which may be a semiconductor switch to a battery and the switch is opened either directly by the opening shutter release button or in responses to the voltage across the electronic flash charge capacitor to open and close the switch when such voltage is at a value below and at or above a predetermined voltage respectively, such value preferably being very little less than the normal full charge voltage of the capacitor.

The improved camera apparatus is highly reliable and simple to operate and permits the accurate focussing of a camera under dark or low light ambient conditions and obviates any adverse effects of the auxiliary illumination of the object on the photographing results.

DESCRIPTION OF THE PREFERRED EMBODIMENT

Referring now to the drawings, particularly FIGS. 1 to 4 thereof which illustrate a preferred embodiment of the present invention, the reference numeral 1 generally designates an electronic photographic flash unit or device which is separably mounted on the camera body and is provided with and houses an auxiliary illumination device in accordance with the present invention. The flash unit 1 is releasably connected to the camera body by an accessory mount or shoe 2 located atop the camera body. When the coupling leg of the flash device 1 is inserted in the accessory mount portion 2, then a synchronizing or trigger switch 20 provided in the camera body is connected to the so-called direct contact terminal 18 in the flash unit circuit. The connection of such a switch to the circuit may be of the so-called German terminal system. Shown at 3 is a diffusion lens, which is formed flat and diffuses toward a photographic object the flashlight emitted from a flash tube 4 which is disposed behind the diffusion lens.

Figure 1:
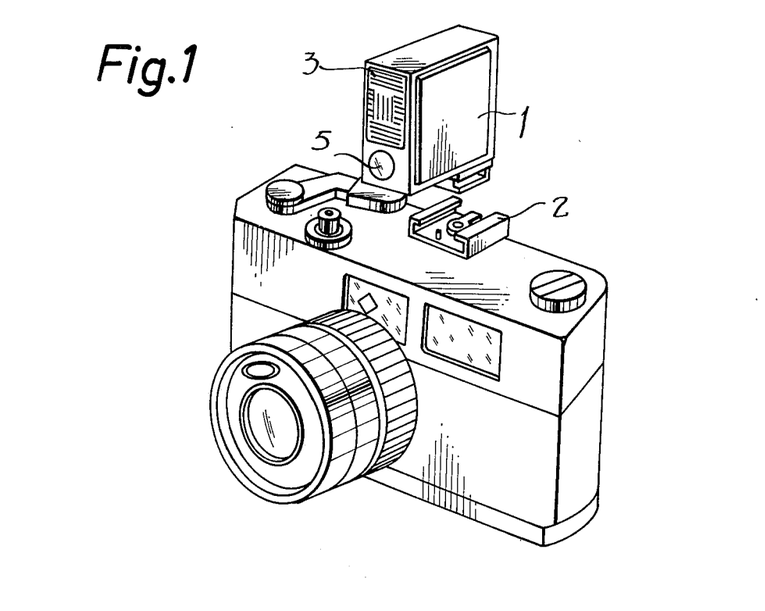
FIG. 1 is a front perspective view of a camera apparatus including a separable flash unit embodying the present invention.
Figure 3A:
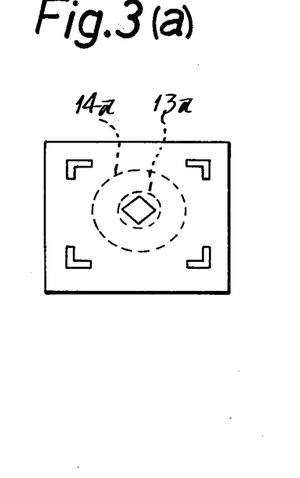
FIG. 3(a) is a view through the view finder of the camera.

Located below window 3 is a window 5 for auxiliary illumination light, through which window is projected toward the photographic object direct light from an auxiliary illumination lamp 6 as well as light reflected by a parabolic reflector 7 located behind lamp 6 and at whose focal point auxiliary illumination lamp 6 is located. The window 5 is provided with a concave lens of low refractive power. Thus, in the case of a camera having a double-image registering type of focus determining view-finder as shown in FIG. 1, then the region of central light 16 mates with or is involved in a double-image appearing area 13a in the field of the view-finder, as shown in FIG. 3(a). On the other hand, in the case of a camera which is of the single lens reflex type, the region of central light 16 mates with or is involved in the focus detecting area 13b in the central part of the field of viewfinder. The central light brightly illuminates the area 16 of the photographic object, on which the objective lens of the camera is to be focussed, the control light being a combination of light reflected by the parabolic reflector 7 with direct light from the auxiliary illumination lamp, while the peripheral light 14 illuminates a peripheral area 17 of the photographic object (the areas such as shown at 14a in FIG. 3(a) and at 14b in FIG. 3(b), respectively), the peripheral light 14 being part of direct light from the lamp 6. This auxiliary illumination light projecting optical system may be so arranged as to simply project on a photographic object a circle of light or one having a distinct predetermined shape or contour to provide mated double-images of the circles of light, or otherwise, to allow the focus adjustment by having an image focussed. Furthermore, it is particularly useful for the optical system that the direction of light being radiated is adjustable or variable, so that the light may be directed in the same direction as that of the view finder and objective of the camera, irrespective of the mode of the photographic flash device 1 being mounted on the camera.

Figure 2:
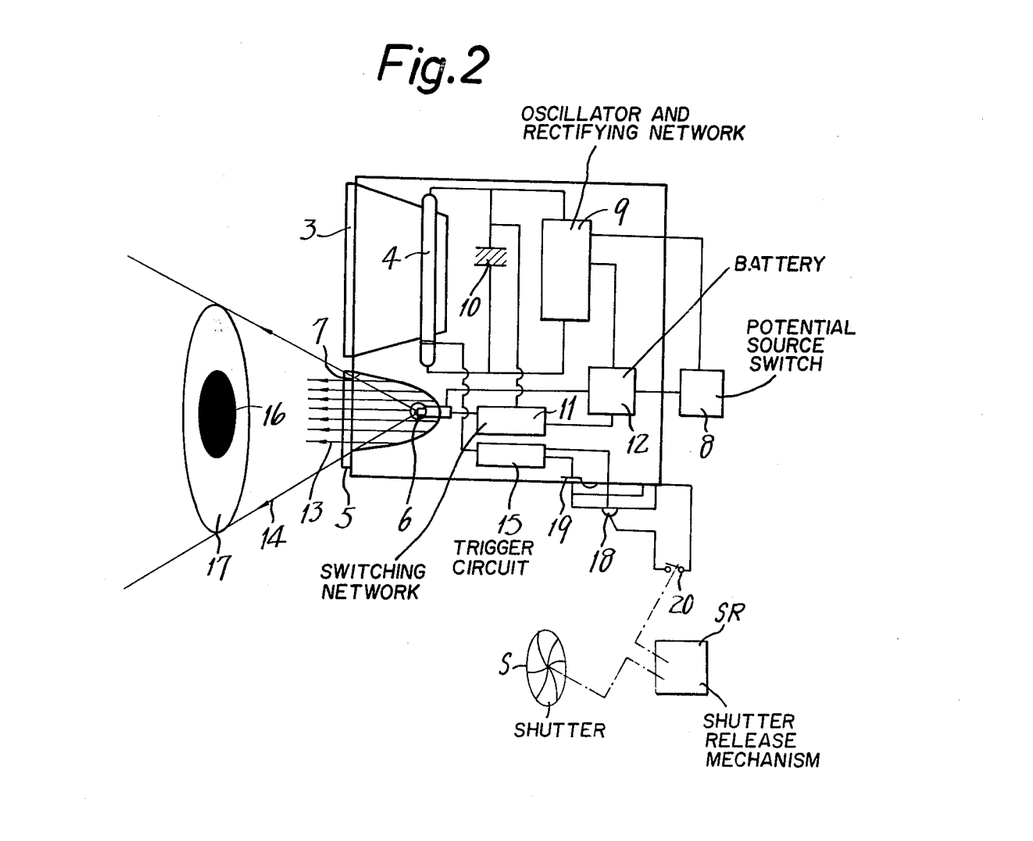
FIG. 2 is a block diagram of the flash unit including the auxiliary light projector.

Shown at 8 is a potential source switch, at 9 an oscillating rectifying circuit network for raising the voltage battery 12 to electrically charge a main condenser or charge capacitor 10 to be used for the flash tube energization and at 11 a switching circuit, which is adapted to conduct when the voltage across the main condenser 10 is raised to a level higher than a given or predetermined level, and which is adapted to be cut-off or open when the voltage level of the main condenser 10 is lower than the predetermined level. Shown at 15 is a trigger circuit for the flash tube, which is connected through the direct contact terminal 18 and contact 19 to the trigger or synchronizing switch 20 of the camera. The trigger or synchronizing switch 20 is coupled to a shutter releasing mechanism SR which sequentially opens and closes a shutter S, as is well known in the art.

Figure 4:
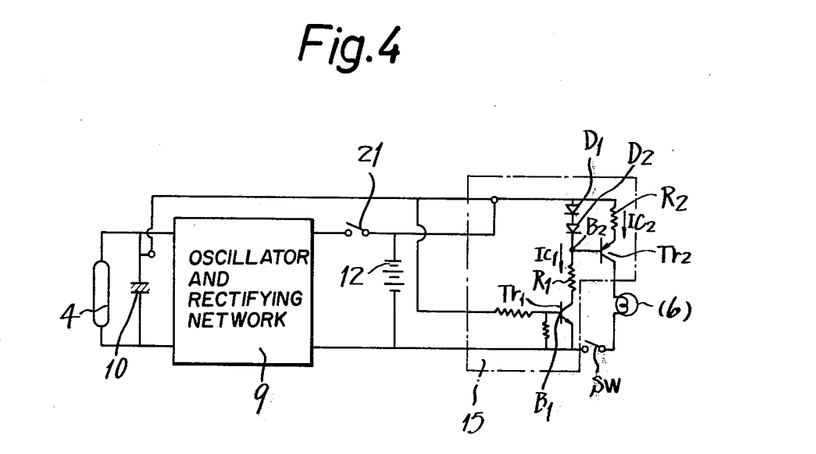
FIG. 4 is a circuit diagram of the light projector deactivating network.

Considering the switching circuit 11 shown by way of example in FIG. 4, diodes D1 and D2 and a resistor R1 are connected in series between battery 12 and the collector of transistor Tr1 whose base is connected through a resistor to one terminal of the main condenser 10. The auxiliary illumination lamp 6 is connected to the collector of a transistor Tr2 whose base is connected to a junction point between the diode D2 and the resistor R1. Shown at SW is a manual switch, and at 21 a potential source switch for the flash tube and auxiliary lamp energizing circuit. In FIG. 4, the flash trigger circuit which is conventional is omitted.

Figure 3B:
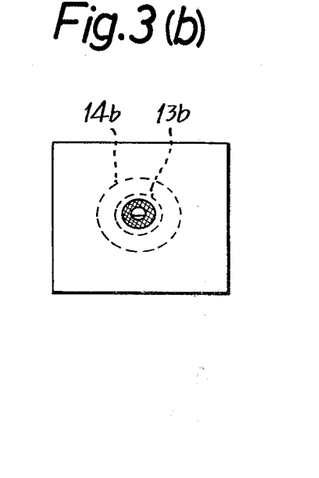
FIG. 3(b) is a view similar to FIG. 3(a) but as applied to a single lens reflex type camera viewer.

In operation, when the photographic flash device is mounted on the camera, and the manual switch SW and the potential source switch 21 are closed, then a current is fed through the oscillating rectifying circuit 9 to the main condenser 10 at an increased voltage. When the voltage level of the main capacitor 10 is raised to more than a given level, then the transistor Tr1 will be rendered conducting. Consequently, the transistor Tr2 also becomes conducting, thereby energizing and lighting the lamp 6. Since the transistor Tr2 is biased by the diodes D1 and D2, a constant current is fed to the lamp 6. The lamp 6 illuminates part of a photographic object. Thus, a photographer observes through the view finder a photographic object, whose area 13a or 13b is bright enough for the focus adjustment, as shown in FIGS. 3(a) and (b), and whose peripheral part is dark, so that a photographer can focus the lens of the camera on a photographic object while observing the same. After completion of adjustment of the focus, if the shutter is released, then the trigger switch will be closed by the shutter releasing mechanism SR in association with the release of the shutter, whereby the flash tube 4 is triggered and fired to discharge electricity from capacitor 10, thus emitting flash light. When the flash tube 4 starts discharging, the voltage level of the main condenser 10 is lowered, thereby interrupting the feeding of current to the switching circuit including the transistors Tr1 and Tr2, etc., whereby the lamp 6 is deenergized and extinguished.

With the aforesaid arrangement, the lamp 6 is kept lit for a very short period of time after the shutter has been released. However, such a duration is negligibly short, as compared with the duration, for which the shutter is maintained in the open position. In case such a duration is of consequence, it is recommendable that the manual switch SW be opened beforehand, after the focus adjustment has been completed.

In the specific embodiment described above, there is shown an auxiliary illumination lamp 6 which is adapted energized or deenergized depending on the level of the voltage across or on the main condenser 10 used for the flash tube. However, the present invention is not limited to the specific embodiment shown. As an alternative, in order to extinguish the auxiliary illumination lamp, a signal for closing the flash tube trigger switch is fed as an input to a circuit such as a bistable multivibrator, a flip-flop circuit, or a monostable multivibrator, in which the duration, for which the auxiliary lamp is kept deenergized and extinguished is longer than the shutter speed. The starting signal may be derived from the coil in the flash tube trigger circuit, rather than from the trigger switch directly. If the camera may be modified to a special arrangement adapted to the auxiliary illumination device, it is preferable that a switch be provided, which is closed at the initial state of the shutter release sequence so as to extinguish the auxiliary illumination lamp. The manual switch SW may be such as to normally be open, and when necessary, may be closed by depressing a push-button which is normally maintained in its returned position.

The auxiliary illumination lamp, according to the present invention, is so arranged as to be extinguished in association with the release of the shutter or the operation of the flash device, thus insuring an image which is substantially free from any undesired influence due to the auxiliary illumination. Furthermore, if the optical system is so arranged as to project auxiliary illumination light at a given angle, the light may be efficiently utilized for illuminating a desired part of a photographic object. If the auxiliary illumination lamp is so arranged as to be extinguished in association with the operation of the trigger switch, and if the auxiliary illumination device is provided in the flash device, then the auxiliary illumination device may be used with a variety of cameras, which are not specifically designed for particularly auxiliary illumination. If an auxiliary illumination lamp is so arranged that it is energized when the main condenser used for energizing the flash tube sufficiently charged for light emission from the flash tube and extinguished in association with the emission of light from the flash discharge tube, such as at the time of discharge from the main condenser, then the auxiliary illumination light may be utilized for indicating the condition of the flash tube and condenser being ready for flashing.

Referring now to FIGS. 5 through 8 which show another embodiment of the present invention, on the front portion of the camera body 31, there are provided a rotatable distance adjusting or focussing ring 41, and a lens barrel 32 in which a picture taking or camera objective lens 40 is mounted in a manner to move back and forth through the rotation of the adjusting ring 41. Disposed in the upper portion of the camera body 31 is a view finder which includes a front objective lens 34 and a rear eye-piece lens 36, between which lenses is disposed a light semi-transmissive mirror 35 at an angle of 45° with respect to the optical axis of these lenses.

Figure 5:
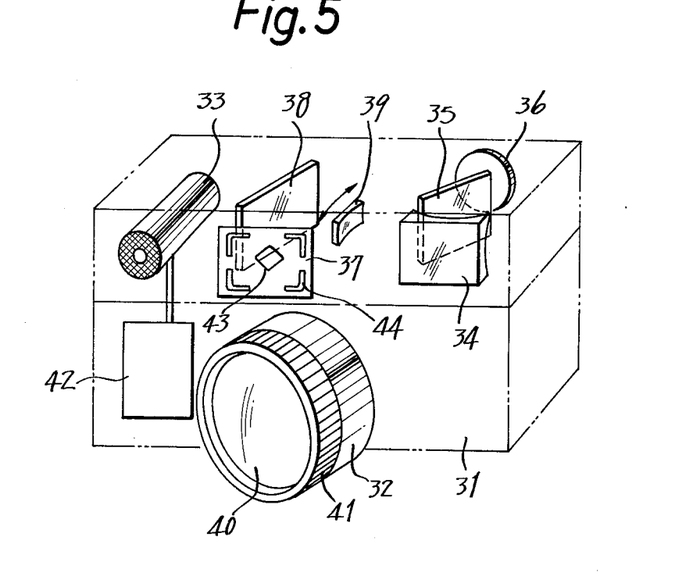
FIG. 5 is a front perspective view and block diagram of the optical components of another embodiment of the present invention.

Furthermore, in the front portion of the camera body 31, there is provided a range finder or distance measuring window plate 37 spaced a predetermined reference distance from the view finder objective lens 34 and having slots 44 serving as a bright frame, and a distance measuring aperture 43. Disposed behind the window plate 37 at an angle of 45° thereto and substantially in parallel relation to the optical axis of the view finder is a total reflection mirror 38, which serves to direct the light, which has been transmitted through the distance measuring aperture 43 and slots 44, toward the light semi-transmissive mirror 35, so that the light may enter through the light semi-transmissive mirror 35 into the eye-piece lens 36. A distance measuring lens 39 rotatable in the direction of the arrows is disposed between the reflectors 38 and 35 in a manner to intersect with the aforesaid light. The rotation in the direction of arrows, of the distance measuring lens 39 is effected in association with the rotation of the distance adjusting ring 41 in the lens barrel 32, thus serving as an intercoupled distance measuring indicator.

If the picture-taking lens 40 is adjusted to a given distance, an image within the view finder, of an object positioned at the aforesaid given distance may be viewed in the eye-piece lens as being in register with an image within the distance measuring field of view, while other images of other objects in the field of the view finder may be seen out of register with the light measuring image within the distance measuring viewfield.

Figure 6:
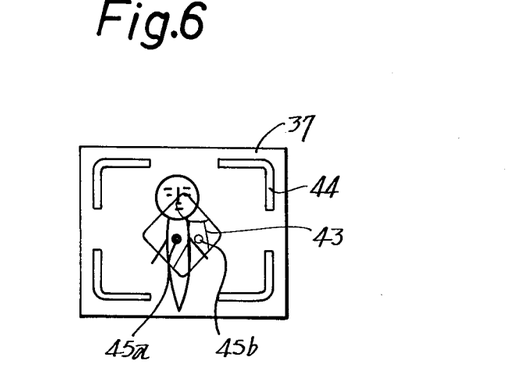
FIG. 6 is a view through the view finder thereof.

In this embodiment, a spotlight projecting device 33 is provided in the camera body. The spotlight projecting device 33 emits a narrow beam of low divergence or almost completely parallel light, so that extremely small circles of light 45a and 45b may be projected on the object standing at a distance adjusted, as compared with that of the distance measuring field of view. When observing through the finder eye-piece lens 36, doubled images 45a and 45b may be seen, together with the doubled images of the object, which appear in the distance measuring field of view. The double images of spotlight 45a and 45b are brought into register with each other by rotating the distance adjusting ring 41, so that the camera may be adjusted for a desired distance from the object, onto which the spotlight has been projected.

In case a scene is too dark to focus the camera on an object by bringing double the images of the object in register with each other, then the spotlight projecting device is lit, and the double images of spotlight formed on the object are brought into register with each other, thus adjusting a distance from the camera to the object. In this case, even if the scene is not entirely dark, for example, such as a scene illuminated by a lamp in a room, the focus of the camera on an object may be adjusted by bringing the circles of spotlight 45a and 45b in register with each other. In the latter case, in order to clearly distinguish the spotlights from the light in the scene, a color filter may be attached to the spotlight projecting device.

Figure 7:
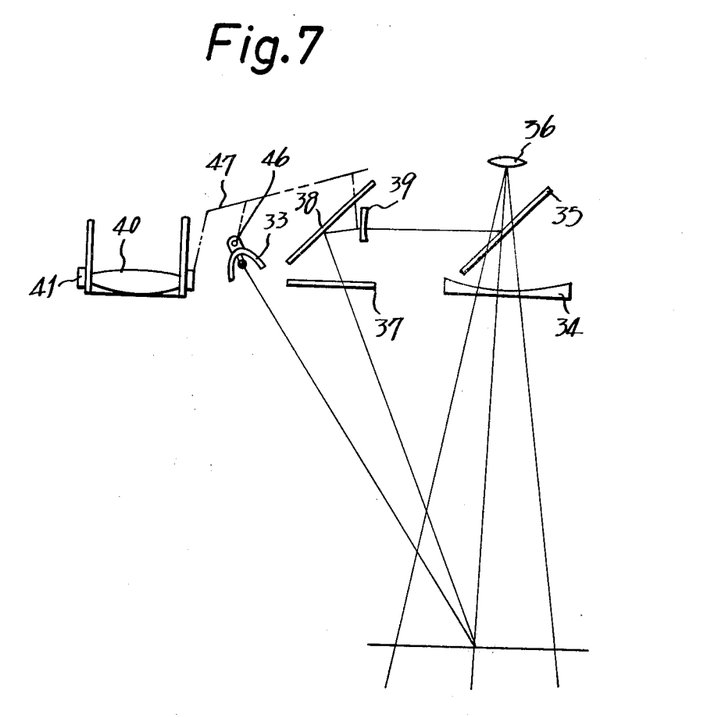
FIG. 7 is a plan view of the optical components and the light ray paths.

In order to cause the spotlight to fall on an object in the distance measuring field of view, if the beam emitted from the spotlight projecting device is designed so as to cross the distance measuring field of view at a given distance, say 3m from the spotlight projecting device, in a manner that the size of each circle of light which is to be formed by the beam of spotlight is much smaller than that of the distance measuring field of view, then it becomes possible that the distance determining images of the spotlight may be formed for an object which stands within the normal picture-taking distance ranging from a short distance to a long distance. Where it is desired to focus the camera on objects to be photographed over a wide range of distance, an angular adjusting or turning means 46 is provided for the spotlight projecting device relative to the camera body as shown in FIG. 7. The means 46 is interlocked with the distance adjusting ring 41 and a known interlocking mechanism 47 consisting of a gear train, a link mechanism or the like, so that the central axis of the spotlight projecting device may always cross the optical axis of an image in the distance measuring field of view. In this case, adjustment of the distance is effected by matching the distance measuring images with a given position within the field of view of a finder. This makes adjustment of distance easier than in the case where the adjustment of distance is effected by bringing double circles of light in register with each other, thus allowing the use of less intensity of spotlight, with the resulting saving in consumption of power.

A potential source, and members for controlling the operation of the spotlight device and its angular rotation with respect to the camera body are shown enclosed with a block 42 in FIG. 5. It is required that the spotlight projecting device be put off prior to the commencement of exposure by means of the shutter. To this end, the spotlight projecting device may be so designed as to be interlocked with a release button. The control mechanism 42 is provided within the camera body 31 in the embodiment shown in FIG. 5. However, the potential source and the members for controlling the operation of the spotlight projecting device may be housed in a camera accessory, such as in the electronic flash discharge device.

Figure 8:
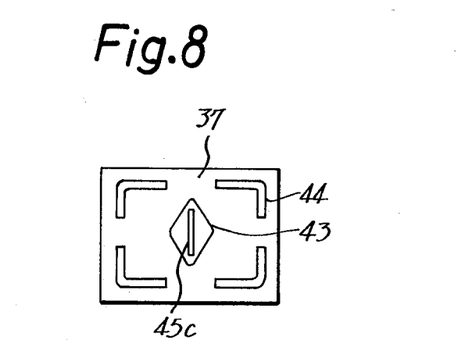
FIG. 8 is a view though the view finder of the apparatus of FIGS. 5 to 7 with a modified auxiliary light projector.

The configuration of the spotlight may be in the shaped of a slit 45c as shown in FIG. 8, in place of the circular shape (such as shown at 45a and 45b) in FIG. 6. Such a spotlight projecting device is useful for a view finder of a single lens reflex camera, which is of a split-image focussing type. The configuration of the spotlight may be variant, according to the forms of images to be matched.

FIGS. 9 through 13 illustrate a further embodiment of the present invention in which an illumination light-projecting device is provided in the camera body, the illumination light-projecting device comprising a light source adapted to emit light when connected to a potential source, and a reflector device having at least a single concave reflector disposed in facing relation to the light source. The illumination light projecting device confines the light beam from the light source through an angle smaller than the projecting angle which is substantially equal to an angle of the distance measuring field of view of a range finder disposed in the camera body, thereby illuminating an object to be photographed within a range of distance measuring field of view of the range finder.

Figure 9:
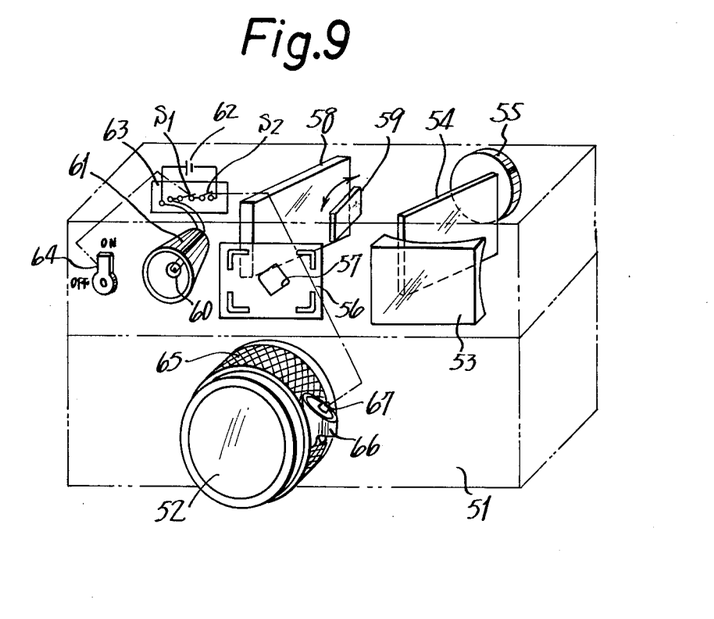
FIG. 9 is a view similar to FIG. 5 of a further embodiment of the present invention.

Referring to FIG. 9, a picture taking lens 52 is mounted on the outer front face of the camera body 51. In the front, upper portion of the camera body, there are provided a concave lens 53 and a frame plate 56 having a distance measuring aperture 57, which is spaced a fixed predetermined distance from the concave lens 53. The concave lens 53 and an eye-piece lens 55, constitutes an inverted Galileo type finder optical system, a semi-transmitting reflector 54 being disposed in the camera body 51 between lenses 53 and 55, and the eye-piece lens 55 being positioned in the rear portion of the camera body. Thus, light through the distance measuring aperture 57 is reflected at a right angle on a total reflection reflector 58 which is disposed in facing relation to the distance measuring aperture 57, then transmitted through a distance measuring lens 59 rotatable in the direction of arrow, and enters the eye-piece lens 55 via the light semi-transmissive mirror 54.

Disposed in the neighborhood of the distance measuring aperture 57 is an illumination light-projecting device and a control circuit 63, the illumination light projecting device having a light source lamp 60 and a parabolic concave reflecting shade 61 which faces the light source lamp 60, and the control circuit being adapted to connect or disconnect the light source lamp 60 with or from the potential source 62. A first lever 64 for actuating a first switch S1 in the control circuit 63 is provided on the front face of the camera body.

A rotatable, distance-adjusting ring 65 is positioned on the picture-taking lens 52 and provided with a second operating member 66, to which is to be secured a second switch actuating member 67 for actuating a second switch S2 in the control circuit 63. The first and second switches S1 and S2 and the light source lamp 60 are connected in series across a potential source 62.

Figure 10:
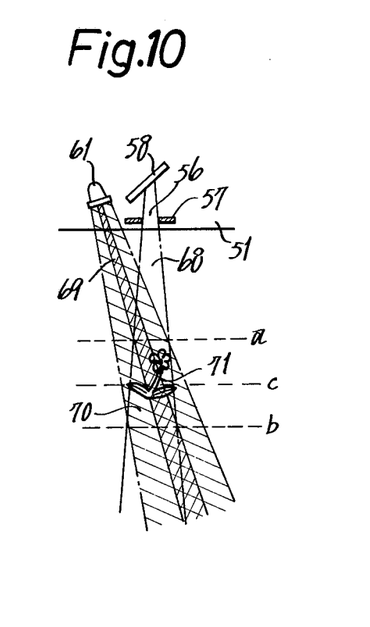
FIG. 10 is a plan view of some of the components and light paths of the apparatus of FIG. 9.

In case the scene is bright and there is a difference in brightness, which permits measurement of distance by the range finder in the natural light, then the first operating lever 64 is maintained off so as to maintain the first switch S1 in its off-position. This then eliminates a possibility that the light source lamp 60 is unexpectedly lit, even in the event that the second operation member 66 is inadvertently moved to close the second switch S2, when the distance adjusting ring 65 is rotated for adjustment of distance.

Where an object to be photographed is exposed to low light, such as at the time of sunset, and there is hardly any difference in brightness which permits measurement of distance by the range finder in the ambient light, then the first operating lever 64 is rotated to its on-position so as to close the first switch S1. Then, the distance adjusting ring 65 is rotated, and the second switch operating member 65 is operated so as to close the second switch S2, whereby the light source lamp 60 is lit. The light from the light source lamp 60 is projected in the form of a conical beam by the reflector shade 61 having a parabolic concave surface, as shown in FIG. 10. In this case, the central light of the conical beam is projected as a substantially parallel beam of light 69.

Figure 11:
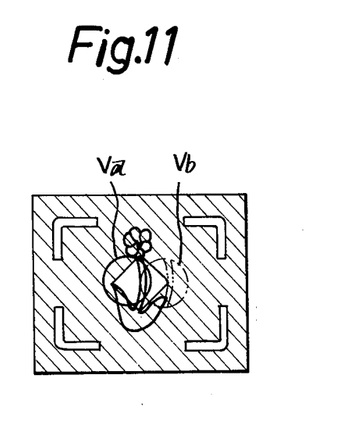
FIG. 11 is a view through the view finder thereof.

The range of the distance measuring field of view of the range finder is shown at 68. If the range, in which the light 70 substantially completely crosses the range 68, is assumed to cover from $a$ meter to $b$ meter, i.e., from 1m to 7m, respectively, as measured from the camera, if an object to be photographed stands at a distance of $c$ meter from the camera, and further provided that $am \leq cm \leq bm$, then there results a considerable difference in brightness in a portion 71 of the object to be photographed, which is illuminated by the light 70, so that a finder image V$a$ and a distance measuring image V$b$ will be clearly seen in overlapped relation in the view finder, as shown in FIG. 11. By bringing these images in register with each other, measurement of distance may be effected with ease. In the condition of FIG. 11, when the distance adjusting ring 65 is rotated, while pushing the second switch operating member 66, then the light source lamp 60 is maintained lit, while the distance measuring lens 59 is rotated through a very small angle in association with the rotation of the distance adjusting ring 65, so that the aforesaid two separate images V$a$ and V$b$ will be brought into register with each other, whereby distance is adjusted accurately but with ease.

Figure 12:
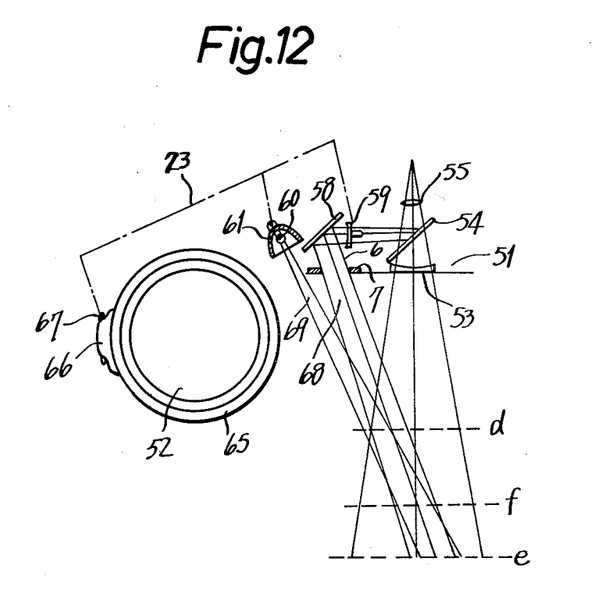
FIG. 12 is a plan view of the optical components and light paths of the camera apparatus of a still further embodiment of the present invention.
Figure 13:
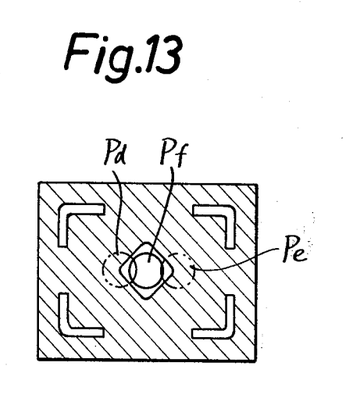
FIG. 13 is a view of the view through the view finder.

In this embodiment, the illumination light-projecting device may be fixedly mounted in the camera body 51 in a manner that the light from the aforesaid device may almost perfectly cross the range of distance measuring field of view 68, when a picture is taken at a normal photographing distance. The illumination light-projecting device, as shown in the embodiments of FIGS. 12 and 13, may however be journaled on a vertical rotary shaft provided in the camera body 51, in a manner that the beam of light 69 in the central portion of the aforesaid light illuminates the central portion of the range of distance measuring field of view 68. In addition, the aforesaid device is so designed as to be rotated in association with the rotation of the distance adjusting ring 65 and the operation of a known interlocking mechanism 73 consisting of a gear train, a link mechanism or the like. The beam 69 in the central portion of the light consists of almost parallel light, and hence the intensity of the light is higher in the central portion of the light than in the peripheral portion thereof. The use of the beam of light 69 facilitates the distance measurement, as well as is convenient for a photographer in learning the condition of the surroundings, in which an object is placed. Furthermore, a photographer can learn of the desired focussing condition by observing where a circle of light is located relative to an image which appears in the distance measuring aperture, i.e., by observing a circle of the light located in the center of the image seen through the distance measuring aperture. Thus, he can known that there results forward focussing or rearward focussing according to an extent of deviation of the circle of light from the center of the image appearing in the distance measuring aperture.

The embodiments described above refer to the cases where the illumination light projecting device is used with the double image mating type, distance measuring indicator. The illumination light projecting device according to the present invention is applicable for a split-image tupe range finder, as well as to a focussing device using a focussing plate which has a scattering surface.

In the embodiment last described, the first and second switches S1 and S2 are used for electrically connecting the light source lamp to the potential source, but only a single switch may be used, with the other switch omitted. This single switch may be of the type which is adapted to be automatically turned on and off due to an output of a light measuring circuit responsive to scene brightness.

The potential source 62 for the light source lamp may be used in common with a potential source for an exposure control circuit, or may be used in common with a potential source for a flashing device when such is used. As an alternative, a potential source which is housed in the camera body is normally used, and when the flashing device is used, the potential source may be automatically or manually changed over to a potential source for the flashing device.

While there have been described and illustrated preferred embodiments of the present invention, it is apparent that numerous alterations, omissions and additions may be made without departing from the spirit thereof.

We claim:

1. An auxiliary illumination device for use with a photographic camera which includes a shutter and a view-finder having means for visibly indicating the focus condition of an image of a photographic object, and for use with a flash device which includes an electronic flash tube, a capacitor, means for charging said capacitor and a trigger circuit for discharging said capacitor for firing said electronic flash tube in synchronism with the opening of said shutter, said auxiliary illumination device comprising:
   an illumination lamp for projecting light on a part of the photographic object;
   a power supply circuit for supplying electric power to said illumination lamp; and
   means for permitting and interrupting the power supply to said illumination lamp respectively upon accomplishment of the charging and discharging of said capacitor.

2. An auxiliary illumination device as defined in claim 1, wherein said auxiliary illumination device is provided in said electronic flash device.

3. An auxiliary illumination device as defined in claim 2, wherein said power supply permitting and interrupting means includes a switching circuit adapted to be conductive and non-conductive respectively upon the accomplishment of the charging and the discharging of said capacitor, and wherein said switching circuit, said illumination lamp and said power supplying circuit are connected in series with each other.

4. An auxiliary illumination device as defined in claim 1, wherein said trigger circuit includes a trigger switch arranged in said camera and closed for discharging said capacitor in synchronism with the opening of said shutter.

5. An auxiliary illuminating device as defined in claim 1, further comprising an optical system for projecting toward the part of the photographic object said light from said illumination lamp at a predetermined angle with respect to the optical axis of said view finder.

6. An auxiliary illumination device as defined in claim 1, wherein said device is provided in said camera.

7. An auxiliary illumination device as defined in claim 6, wherein said focus indicating means includes a first and second optical system spaced a given reference distance from each other and respectively capable of forming a virtual image of the photographic object, and said second optical system has an optical member moved in association with the focussing operation so that the virtual image formed by said second optical system is superimposed on the virtual image formed by said first optical system when focussing has been effected.

8. An auxiliary illumination device as defined in claim 7, wherein said illumination lamp is fixed on said camera so that said light from said illumination lamp traverses the optical axis of said second optical system.

9. An auxiliary illumination device as defined in claim 7, wherein said second optical system includes a window disposed so as to be observed at the center of said view finder.

10. An auxiliary illumination device as defined in claim 9 further comprising means for converging said light from said illumination lamp to form a light spot on the photographic object and means for changing projection direction of said light from said illumination lamp in association with the focussing operation so that the virtual image of the part of the photographic object, which is being illuminated by said light from said illumination lamp, is observed with said window superimposed thereon when the focussing has been completed.

11. An auxiliary illumination device as defined in claim 10, wherein said light converging means includes a reflector having a parabolic reflecting surface and disposed behind said illumination lamp.

12. An auxiliary illumination device as defined in claim 10, wherein said light converging means is constructed so as to restrict the width of said light from said illumination lamp in such manner that only an elongated rectangular part of the photographic object is illuminated by said light from said illumination lamp.

13. An auxiliary illumination device for use with a photographic camera which includes a shutter, a focus adjusting member for adjusting focus condition of an image of a photographic object, and a view-finder having means for visibly indicating the focus condition of said image, said illumination device comprising:
   an illumination lamp for projecting light on a part of the photographic object;
   a power supplying circuit for supplying electric power to said illumination lamp;
   switching means disposed in said power supplying circuit and being normally non-conductive for interrupting the power supply to said illumination lamp; and
   manual means operable for rendering said switching means conductive, said manual means being disposed at a position in which the same is operable together with said focus adjusting member while the latter is being operated.

14. An auxiliary illumination device as defined in claim 13, wherein said switching means includes a switch which is closed in association with the operation of said manual means.

15. An auxiliary illumination device as defined in claim 14, wherein said device is provided in said camera.

16. An auxiliary illumination device as defined in claim 15, wherein said focus indicating means includes a first and second optical system spaced a given distance to each other and being respectively capable of forming a virtual image of the photographic object so that said virtual images formed by said first and second optical systems are superimposed with each other, and wherein said second optical system includes an optical member adapted to move in association with the operation of said focus adjusting member so that said virtual image formed by said second optical system is moved relative to said virtual image formed by said first optical system and so that said virtual images superimposed with each other coincides with each other when focussing has been completed.

17. An auxiliary illumination device as defined in claim 16, wherein said illumination lamp is fixed on said camera so that said light from said illumination lamp traverses the optical axis of said second optical system.

18. An auxiliary illumination device as defined in claim 17, wherein said second optical system includes a window disposed so as to be observed at the center of said view finder.

19. An auxiliary illumination device as defined in claim 18, further comprising means for converging said light from said illumination lamp to form a light spot on the photographic object and means for changing projection direction of said light from said illumination lamp in association with the focussing operation so that the virtual image of the part of the photographic object, which is being illuminated by said light from said illumination lamp, is observed with said window superimposed thereon when the focussing has been completed.

20. An auxiliary illumination device as defined in claim 19, wherein said light converging means includes a reflector having a parabolic reflecting surface and disposed behind said illumination lamp.

21. An auxiliary illumination device as defined in claim 13 wherein said manual means is disposed on said focus adjusting member.

22. In a camera apparatus including a camera having a forwardly directed objective lens of adjustable focus, a shutter, an exposure mechanism for sequentially opening and closing said shutter, and a focus adjusting member for adjusting focus condition of an image of a photographic object, the improvement comprising:
   an auxiliary light projector forwardly directing a beam of light;
   means responsive to the operation of said exposure mechanism for deactivating said auxiliary light projector during the open condition of said shutter;
   means for converging said beam of light from said auxiliary light projector to form a light spot on a photographic object; and
   means for indicating focus condition of an image of said photographic object, said focus indicating means including a first and a second optical system spaced a given reference distance to each other and being capable of forming a virtual image of said photographic object respectively so that said virtual images formed by said first and second optical systems are superimposed with each other, and said second optical system including an optical system including an optical member adapted to move in association with the operation of said focus adjusting member so that said virtual image formed by said second optical system is moved relative to said virtual image formed by said first optical system and so that said virtual images superimposed with each other coincides with each other when focussing has been completed.

23. The camera apparatus of claim 22 including means for angularly adjusting the direction in which said beam of light is projected in response to the operation of said focus adjusting member.

24. The camera apparatus of claim 22, wherein said camera apparatus includes an electronic photoflash tube and a storage capacitor for energizing said photoflash tube, said projector including a light bulb and said projector deactivating means including a switch connected between said light bulb and a source of current and means responsive to the voltage across said capacitor for opening and closing said switch when said voltage is respectively below and above a predetermined value.

25. The camera apparatus of claim 24 wherein said apparatus comprises a main camera body and an electronic photoflash unit separably mounted on said camera body, said light projector being disposed in said unit.

26. The camera apparatus of claim 22 wherein said apparatus includes a photoflash tube, said deactivating means being responsive to the flashing of said tube for deactivating said light projector.

27. The camera apparatus of claim 22 wherein said camera includes a shutter release member, said deactivating means being responsive to the actuation of said shutter release member.

28. The camera apparatus of claim 22 wherein said auxiliary light projector is angularly adjustable.

29. The camera apparatus of claim 22 wherein said deactivating mechanism is responsive to the opening of said shutter.

30. The camera apparatus of claim 22 wherein said projector is disposed in said camera.

* * * * *